UNITED STATES PATENT OFFICE.

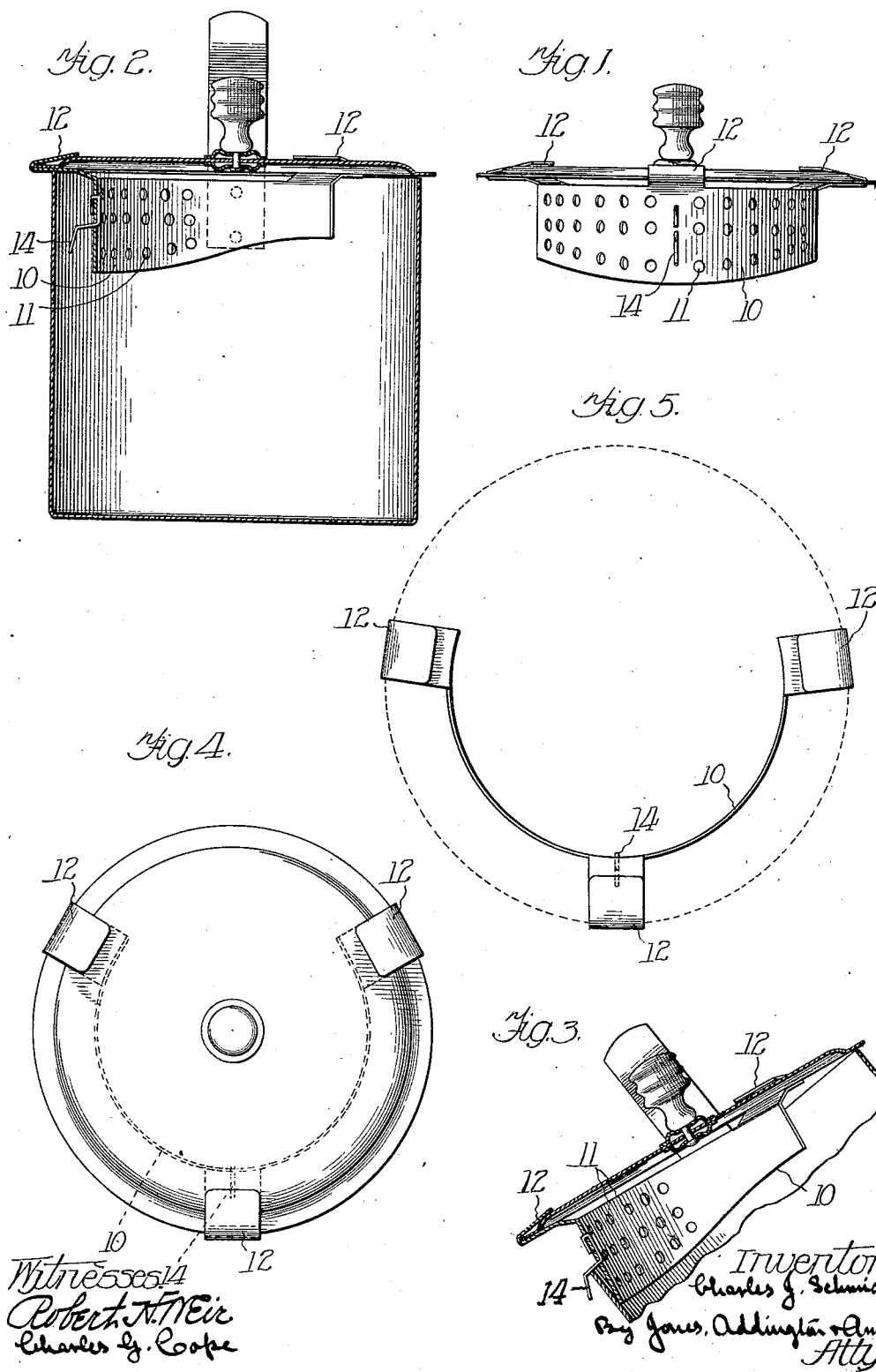

CHARLES J. SCHMIDT, OF CHICAGO, ILLINOIS.

STRAINING DEVICE.

992,268.  Specification of Letters Patent.  Patented May 16, 1911.

Application filed March 8, 1910. Serial No. 548,088.

*To all whom it may concern:*

Be it known that I, CHARLES J. SCHMIDT, a citizen of the United States, residing at Chicago, in the county of Cook and State of Illinois, have invented new and useful Improvements in Straining Devices, of which the following is a full, clear, concise, and exact description, reference being had to the accompanying drawing, forming a part of this specification.

My invention relates to culinary implements and has as its object the provision of a simple and cheap device for enabling the liquid to be strained off from the contents of sauce-pans and other cooking utensils. I attain the above object by providing a straining device adapted to be secured to the lower side of the lid of a sauce-pan or the like so as to extend downward in a curve following the curve of the periphery of the lid. The straining device is adapted to be held in such a position relatively to the lid and the sauce-pan that the liquid may be conveniently strained off therethrough.

I have illustrated, by way of example, one form in which my invention may be embodied, in the accompanying drawings, in which:—

Figure 1 is a front elevation showing a sauce-pan lid equipped with a straining device constructed in accordance with my invention; Fig. 2 is a sectional side elevation showing the lid and straining device in position upon a sauce-pan; Fig. 3 is a fragmentary view similar to Fig. 2 but showing the cover tilted to enable the contents of the sauce-pan to be strained; Fig. 4 is a plan of the cover and straining device; and Fig. 5 is a plan of a larger cover having the straining device mounted thereon, this figure illustrating the adaptability of the straining device to different sizes of cover.

Referring to Fig. 1 of the drawings, the straining device comprises a metallic strip 10 formed with a plurality of strainer holes therein, such strainer holes being designated as 11. The upper edge of the strip 10 is provided with a plurality of clips 12, these clips being, in the device illustrated, three in number. The clips 12 serve to secure the strip 10 to the sauce-pan lid or the like to which the straining device is to be attached, and to that end they are made resilient so that they will grip the edge of the lid and firmly secure the strip 10 in place, while allowing it to be readily removed if desired.

In the device illustrated, the clips 12 are shown as being made by forming lugs upon the strip 10 and bending such lugs forward and then backward upon themselves to form spring clips, but such method of securing the perforated strip to the lid is not essential as other methods may be used without departing from the spirit of my invention or exceeding the scope of the appended claims.

The strip 10 is located, during the ordinary use of the sauce-pan, beneath the cover within the sauce-pan. When, however, it is desired to strain off the liquid from the contents of the sauce-pan the cover is changed from the position shown in Fig. 2 to a tilted position such as that shown in Fig. 3. In such a tilted position the strip 10 closes the gap between the lid and the upper edge of the sauce-pan and thus prevents the solid contents from falling out, the liquid being enabled to emerge through the strainer holes 11. Means may be provided for enabling the lid to be conveniently held in the position shown in Fig. 3, such means, in the construction illustrated, consisting of a wire hook 14 secured in a suitable manner to the center portion of the strip 10. This hook is adapted to be held in engagement with the top edge of the sauce-pan whereby the lid and strainer may be firmly held during the straining operation.

The perforated strip 10 is made flexible so as to enable it to be utilized in connection with lids of varying sizes.

Figs. 4 and 5 show the appearance of the straining device when applied to a small lid and a large lid respectively. It will thus be seen that my improved straining device may be sold upon the market without accurate regard being had for the size of lid with which it is intended to be used since the straining device may be used with any size lid within extended limits. Further, it is only necessary to keep one of these devices for use in connection with the various sizes of sauce-pans or the like employed in the ordinary household since the device may be readily detached from one lid and attached to another of a different size.

Having thus described my invention, what I claim as new and desire to secure by Letters Patent, is:

1. A straining device, for attachment to the lid of a saucepan or the like, comprising a foraminous strip, said strip being flexible in a plane at right angles to the plane of the strip, and devices carried by said strip, at different parts thereof, for detachably securing the strip to a lid so as to extend at right angles therefrom adjacent the edge thereof.

2. A straining device for attachment to the lid of a saucepan or the like, comprising a foraminous strip provided with attaching means adjacent each of its ends and at its middle, said strip being flexible in a plane at right angles to the plane of the strip, and said attaching means being disposed substantially at right angles to the strip, whereby said strip may be removably attached to a lid so as to extend substantially at right angles from the lower side thereof adjacent the periphery.

3. A straining device for attachment to the lid of a saucepan or the like, comprising a foraminous strip provided with attaching means adjacent each of its ends and at its middle, said strip being flexible in a plane at right angles to the plane of the strip, and said attaching means being disposed substantially at right angles to the strip, whereby said strip may be removably attached to a lid so as to extend substantially at right angles from the lower side thereof adjacent the periphery, and a stop carried by said strip and adapted to engage the top edge of the saucepan to enable the lid to be conveniently maintained in a tilted position.

4. A straining device, for attachment to the lid of a saucepan or the like, comprising a foraminous strip formed of flexible sheet metal, said strip being formed, at one of its edges with a plurality of spring clips disposed at right angles to the plane of the strip, said spring clips being adapted to engage over the edge of the lid of a saucepan or the like, and thereby to secure said strip to the lid in such a position as to extend at right angles therefrom.

In witness whereof, I have hereunto subscribed my name in the presence of two witnesses.

CHARLES J. SCHMIDT.

Witnesses:
CHARLES G. COPE,
MABEL REYNOLDS.

---

Copies of this patent may be obtained for five cents each, by addressing the "Commissioner of Patents, Washington, D. C."